United States Patent Office 2,807,590
Patented Sept. 24, 1957

2,807,590
METAL ALKARYL SULFONATES AND METHOD OF PREPARING SAME

Harold McDonald and Robert L. Anderson, Chestertown, Md., assignors to Continental Oil Company, Ponca City, Okla., a corporation of Delaware No Drawing. Application March 7, 1956,
Serial No. 590,414

8 Claims. (Cl. 252—353)

The present invention relates to alkali and alkaline earth metal alkylated aryl sulfonates and more particularly to mixtures comprising such sulfonates having improved surface active properties.

Alkali and alkaline earth metal alkaryl sulfonates, also known as synthetic sulfonates to differentiate them from the mahogany or natural sulfonates, have been manufactured in large quantities by a process involving sulfonation of a suitable alkaryl hydrocarbon followed by neutralization of the resulting sulfonic acid with a base. Since sulfonation procedures are well known to those skilled in the art, those processes will not be described here. Although synthetic sulfonates possess many desirable properties as compared to the mahogany sulfonates, they are deficient in certain other properties. As for example, the surface active properties of the synthetic sulfonates, including detergency and the tendency of the reaction mixture to split out the aqueous layer slowly and incompletely during the conversion of the sodium alkaryl sulfonate to an alkaline earth metal alkaryl sulfonate in metathesis reactions are less desirable than similar properties of the mahogany sulfonates.

It is, therefore, a principal object of this invention to provide an alkali or alkaline earth metal alkaryl sulfonate composition which obviates the disadvantages of the prior art compositions. It is another object of our invention to provide a process whereby alkali and alkaline earth metal alkaryl sulfonates can be prepared having improved surface active properties. Other objects and advantages of the present invention will be apparent from the following description.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises a method whereby the surface active properties of alkali and alkaline earth metal salts of an alkaryl sulfonic acid having an average molecular weight within the range of 425–475 may be improved by incorporating in the aforesaid alkaryl sulfonates 3 to 50 weight percent based on the weight of the alkaryl sulfonate, a mixture consisting of a high and a low molecular weight alkali or alkaline earth metal mahogany sulfonate. In many cases the surface active properties of the synthetic sulfonate can be increased by adding the high molecular weight mahogany sulfonate thereto alone. A high molecular weight metal mahogany sulfonate for the purposes of this invention is the metal salt of a mahogany sulfonic acid having an average molecular weight within the range of 450–500. A low molecular weight metal mahogany sulfonate is the metal salt of a mahogany sulfonic acid having an average molecular weight within the range of 350–400. We have found that the higher the molecular weight of the mahogany sulfonate the smaller the quantity required to give our desired results. For example, if 10 weight percent of a mahogany sulfonate prepared from a sulfonic acid having an average molecular weight of 475 is required, the same result may be obtained using 5 weight percent of a mahogany sulfonate prepared from a sulfonic acid have an average molecular weight of 500. As to the amount of each of the mahogany sulfonates in the mixture, we have found that it may vary from 50 to 100 weight percent of the high molecular weight mahogany sulfonate and 50 to 0 weight percent of the low molecular weight mahogany sulfonate. Obviously the amount of the two mahogany sulfonates or either one incorporated in the alkaryl sulfonate may be increased without detrimental effects if such a procedure becomes desirable for any reason.

Before proceeding with the specific examples illustrating our invention, it may be well to indicate in general the types of compounds utilized in preparing these compositions.

Suitable alkali and alkaline earth metal alkaryl sulfonates that may be used include those formed by alkylating benzene, toluene, xylenes, cumene, naphthalene, alkylnaphthalene, diphenyl, alkyldiphenyl, and the halogen derivatives such as chlorobenzene, chlorotoluene and chloronaphthalene followed by sulfonation and finally by neutralization with an alkali or alkaline earth metal base. The alkylation may be made under the influence of a catalyst with alkylating agents from about 3 to more than 20 carbon atoms as for example, haloparaffins, olefins as from dehydrohalogenated haloparaffins, polyolefins such as for example polymers from ethylene, propylene, butylene, ethylene and propylene, alkylsulfates, aliphatic alcohols and others. The catalyst may be sulfuric acid, hydrofluoric acid, phosphorous containing catalysts, aluminum chloride, boron fluoride alone or with activators such as hydrogen fluoride or hydrogen chloride. Other hydrocarbons that may be used are raw petroleum distillate or fractions either subjected to selective solvent action or not. A particularly suitable alkaryl hydrocarbon is the compound called postdodecylbenzene which is a mixture of monoalkylbenzene and dialkylbenzenes in the approximate ratio of 2:3. Its typical physical properties are as follows:

| | |
|---|---:|
| Specific gravity at 38° C. | 0.8649 |
| Average molecular weight | 385 |
| Percent sulfonatable | 88 |
| A. S. T. M., .D–158 Engler: | |
| I. B. P. | °F. 647 |
| 5 | °F. 682 |
| 50 | °F. 715 |
| 90 | °F. 760 |
| 95 | °F. 775 |
| F. B. P. | °F. 779 |
| Refractive index at 23° C. | 1.4900 |
| Viscosity at: | |
| −10° C. | centipoises 2800 |
| 20° C. | 280 |
| 40° C. | 78 |
| 80° C. | 18 |
| Aniline point | °C. 69 |
| Pour point | °F. −25 |

Sulfonation may be accomplished using either oleum, sulfur trioxide or a stabilized liquid sulfur trioxide having more than 99 percent available SO$_3$ content as is available commercially from General Chemical Division of Allied Chemical & Dye Corporation under the trade name "Sulfan." Unrefined sulfur trioxide as obtained from the catalytic oxidation of sulfur dioxide may also be used. The sulfur trioxide may be used undiluted in liquid or gaseous form but it is preferable to use an inert gas as a diluent. Thus, sulfur trioxide diluted with air, nitrogen, sulfur dioxide or methane may be used. Concentrations of from about 5% to 100% by weight sulfur trioxide in the diluent are operable but we prefer a concentration of less than 10%. Temperature during the reaction may be maintained at from about 30 to 100° C. We prefer a temperature of 50–60° C. since below 50° the viscosity of the reacting mixture increases with lowering temperature. With increasing viscosity local overheating takes place with subsequent charring because of increased mixing difficulties. As the reacting temperature is raised above about 60° C., there is increasing charring and resulting darkening of product.

For some sulfonations it is advantageous to use a diluent for the material being sulfonated. Examples of such diluents are pentane, hexane, benzene, mineral oils and dioxane.

Suitable high molecular weight alkali and alkaline earth metal mahogany sulfonates are prepared by neutralizing mahogany sulfonic acids having average molecular weights within the range of 450 to 500. Mahogany sulfonic acids are obtained as a by-product in the manufacture of white oil by sulfonating petroleum oil stocks.

A sodium mahogany sulfonate having an average molecular weight of about 525 (mahogany sulfonic acid average molecular weight 500) was prepared by sulfonating followed by neutralizing with sodium hydroxide a solvent extracted coastal Pale oil. Physical properties of this coastal Pale oil were as follows:

| | |
|---|---|
| A. P. I. gravity | 25.0 min. |
| Robinson color | 9/11. |
| Flash: | |
| Open cup | 455 min. |
| Cloud point | 60° F. max. |
| Pour point | 30° F. max. |
| Viscosity, S. S. U., at 100° F | 900/925. |
| Viscosity index | 60 min. |
| Neutralization No | 0.10 max. |

Mahogany sulfonates of the desired average molecular weights may be prepared by neutralization of mahogany sulfonic acids having average molecular weight within the range of about 450 to 500 which in turn may be prepared from a wide lubricating oil cut of naphthenic origin by redistillation under a vacuum. The first fraction so obtained after sulfonation will have an average molecular weight of about 450. The average molecular weights of each succeeding fraction after sulfonation will be progressively higher the last fraction being about 500.

Suitable low molecular weight alkali and alkaline earth metal mahogany sulfonates are prepared by neutralizing a mahogany sulfonic acid having an average molecular weight within the range of 350 to 400 with an appropriate base. Mahogany sulfonic acids having such molecular weights are prepared by sulfonating a solvent extracted coastal Pale oil having a lower viscosity than that used for preparing a sulfonic acid having a molecular weight of 500. As is well known to those skilled in the art the lower the viscosity of the starting material the lower the average molecular weight of the final product.

In all of our work the alkali metal alkaryl and mahogany sulfonates were prepared by neutralizing the sulfonic acid with the appropriate base. Alkaline earth metal alkaryl or mahogany sulfonates were prepared by a metathesis reaction involving sodium alkaryl or mahogany sulfonate and an alkaline earth metal chloride.

In order to disclose the nature of the present invention still more clearly the following illustrative examples will be given. It is to be understood that the invention is not to be limited to the specific conditions or details set forth in these examples except as such limitations are specified in the appended claims. Parts given are parts by weight.

EXAMPLE 1

As illustrative of the value of our compositions in double decomposition reactions the following experiments were conducted: sodium postdodecylbenzene sulfonate was diluted with a sufficient quantity of 100 Pale oil to form a 40 percent active postdodecylbenzene sulfonate solution. Eighty parts of barium chloride dissolved in 260 parts of water was then added with agitation to 400 parts of the sulfonate solution. The mixture was then allowed to settle, thus forming two layers. After standing for a period of 165 minutes the upper layer, comprising barium postdodecylbenzene sulfonate, was hazy and there was an emulsion cuff at the interface. The experiment was then repeated with the exception that 16 parts of a sodium salt of a mahogany sulfonic acid having an average molecular weight of 470 was added to the 400 parts of the sodium postdodecylbenzene solution. The resulting mixture after standing for a period of 50 minutes formed 2 layers, the barium postdodecylbene sulfonate layer being clear and there was very little emulsion cuff at the interface. When a sodium salt of a mahogany sulfonic acid having an average molecular weight of 500 was substituted for the 470 molecular weight mahogany sulfonic acid, the amount added was reduced to 8 parts. The emulsion broke readily and the overall results were somewhat better than when the 470 molecular weight sulfonate was used.

Calcium postdodecylbenzene sulfonate was prepared by a procedure which can be described as follows: a 25 percent aqueous calcium chloride solution was added with agitation to a 30 percent active postdodecylbenzene sulfonate solution in 100 Pale oil. A total of 1½ equivalents of 100 percent calcium chloride was used per equivalent of 100 percent active sodium postdodecylbenzene sulfonate. The mixture, even after a period of 3 hours, showed little tendency to separate. The experiment was then repeated with the exception that 5 weight percent of sodium salt of a mahogany sulfonic acid having an average molecular weight of 500 based on the weight of the sodium postdodecylbenzene sulfonate was added to the mixture. The resulting composition broke sharply into two layers after standing for 1 hour and the upper sulfonate layer was clear and there was very little emulsion cuff at the interface.

EXAMPLE 2

To illustrate the advantages of our compositions as an emulsifier for white oil the following experiments were conducted: 5 parts of a 6 percent active sodium postdodecylbenzene sulfonate solution in white oil was added to 45 parts of water at 120° C., shaken 20 times, allowed to stand 5 minutes and then shaken an additional 20 times. The emulsion was evaluated 15 minutes after the second shaking. The foregoing experiment was repeated using instead of the 5 parts of the sodium postdodecylbenzene sulfonate, 5 parts of a sulfonate mixture containing varying amounts of sodium postdodecylbenzene sulfonate plus varying amounts of two sodium mahogany sulfonates, one the sodium salt of a mahogany sulfonic acid having an average molecular weight of 470 and the other the sodium salt of a mahogany sulfonic acid having an average molecular weight of 405. The experiments, together with the results are summarized in Table 1 below.

*Table 1*

| | Additive | | | |
|---|---|---|---|---|
| Sample No. | Wt. Percent Na PDB sulfonate | Wt. Percent Na mahogany sulfonate (470 product) | Wt. Percent Na mahogany sulfonate (405 product) | Emulsion |
| 1 | 100 | 0.0 | 0.0 | Unstable. |
| 2 | 95 | 3.0 | 2.0 | Fair. |
| 3 | 80 | 10 | 10.0 | Good. |
| 4 | 50 | 25 | 25 | Excellent. |

PDB=postdodecylbenzene.

EXAMPLE 3

In order to illustrate the value of the sulfonate mixtures as a lubricating oil detergent, the following experiments were conducted. Lubricating compositions were prepared by adding barium postdodecylbenzene sulfonate to a blend of SAE 30 mineral oil. As a companion experiment lubricating compositions were prepared by adding barium postdodecylbenzene sulfonate containing varying amounts of a barium salt of a mahogany sulfonic acid having an average molecular weight of 500 to a blend of SAE 30 mineral oil. The mixtures were heated to about 140° F. with agitation to obtain a uniform blend.

The lubricating compositions thus produced were subjected to cub engine tests. This test may be described briefly as follows: Four-cylinder Cub gasoline engines (International's light tractor engine adapted to a stand test) are run for 36 hours at 2,500 R. P. M. with 11 brake horsepower output, an oil temperature of 280° F., and a jacket temperature of 200° F. After completion of the run, the engines are disassembled and the parts are inspected and assigned demerit ratings based on their condition. The lower the total of demerit ratings, the better is the general engine condition and the oil performance. A rating below 10 is considered to be excellent and a rating between 10 and 15 is good. Corrosion is also measured by weighing the bearing shells before and after the runs. The corrosion rating represents the loss of weight in grams per half bearing shell. A loss due to corrosion of less than 0.05 gram is considered to indicate good performance for the oil. The results of the Cub engine runs are shown below in the table.

*Table 2*

| Composition of sulfonate additive used in oil blends | | Cub demerit rating | Bearing corrosion loss |
|---|---|---|---|
| Wt. Percent Ba PDB sulfonate | Wt. Percent Ba mahogany sulfonate | | |
| 100 | 0.0 | 15.0 | 0.1 |
| 90 | 10.0 | 13.5 | 0.0199 |
| 75 | 25 | 9.0 | 0.015 |

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. The method of improving the surface active properties of a metal salt of an alkaryl sulfonic acid having an average molecular weight within the range of 425 to 475 by incorporating therein and based on the weight of said metal salt 3 to 50 weight percent of a mixture, said mixture comprising 50 to 100 weight percent of a metal salt of a mahogany sulfonic acid having an average molecular weight within the range of 450 to 500 and 50 to 0 weight percent of a metal salt of a mahogany sulfonic acid having an average molecular weight within the range of 350 to 400 wherein the metal of said salts is selected from the group consisting of the alkali and alkaline earth metals.

2. The method of improving the surface active properties of a metal salt of an alkaryl sulfonic acid having an average molecular weight within the range of 425 to 476 by incorporating therein and based on said metal salt 3 to 50 weight percent of a metal salt of a mahogany sulfonic acid having an average molecular weight within the range of 450 to 500 wherein the metal of said salts is selected from the group consisting of the alkali and alkaline earth metals.

3. The process of claim 1 wherein the alkaryl sulfonic acid has an average molecular weight of 445.

4. The process of claim 1 wherein the metal salt of said alkaryl sulfonic acid is sodium alkaryl sulfonate.

5. The process of claim 1 wherein the metal salt of said alkaryl sulfonic acid is calcium alkaryl sulfonate.

6. The process of claim 1 wherein the metal salt of said alkaryl sulfonic acid is barium alkaryl sulfonate.

7. The process of claim 1 wherein the first mentioned mahogany sulfonic acid has an average molecular weight of 500.

8. The process of claim 1 wherein the second mentioned mahogany sulfonic acid has an average molecular weight of 400.

References Cited in the file of this patent

UNITED STATES PATENTS

| | | |
|---|---|---|
| 2,391,087 | Donlan et al. | Dec. 18, 1945 |
| 2,531,166 | Shaw | Nov. 21, 1950 |
| 2,566,298 | Irwin | Sept. 4, 1951 |
| 2,606,872 | Gasser et al. | Aug. 12, 1952 |